G. GIN.

DEVICE FOR SINGEING TEXTILE FABRICS.

APPLICATION FILED JULY 16, 1910.

Reissued Oct. 4, 1910. 13,154.

Witnesses:

George R. Measures.

Emil Jacobs.

Inventor:

Gustave Gin per Walter D. Edmonds. Atty.

UNITED STATES PATENT OFFICE.

GUSTAVE GIN, OF PARIS, FRANCE.

DEVICE FOR SINGEING TEXTILE FABRICS.

13,154. Specification of Reissued Letters Patent. Reissued Oct. 4, 1910.

Original No. 962,828, dated June 28, 1910, Serial No. 424,174. Application for reissue filed July 16, 1910. Serial No. 572,383.

*To all whom it may concern:*

Be it known that I, GUSTAVE GIN, of Paris, France, a citizen of the French Republic, have invented certain new and useful Improvements in Devices for Singeing Textile Fabrics, of which the following is a specification, reference being had to the accompanying drawings, in which—

Figure 1:
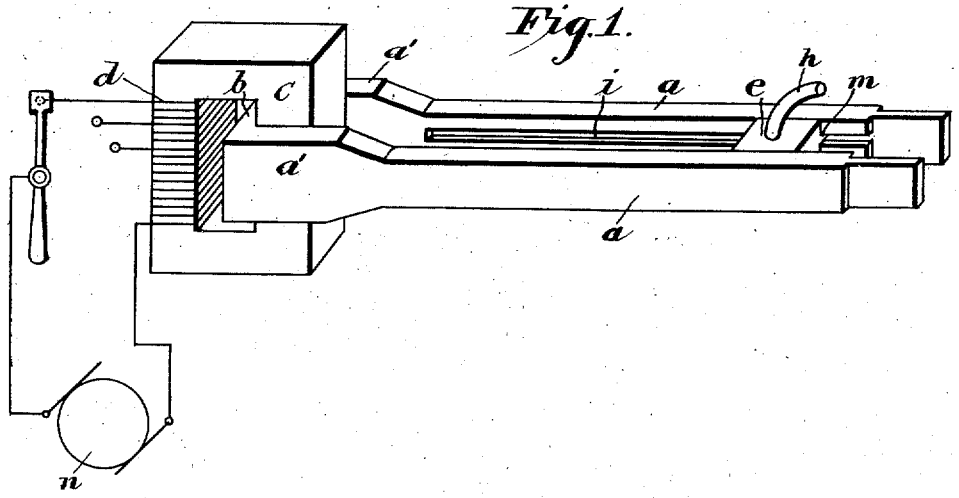
Figure 2:
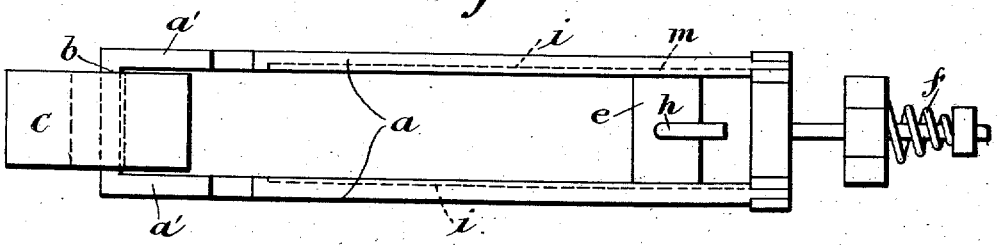
Figure 3:
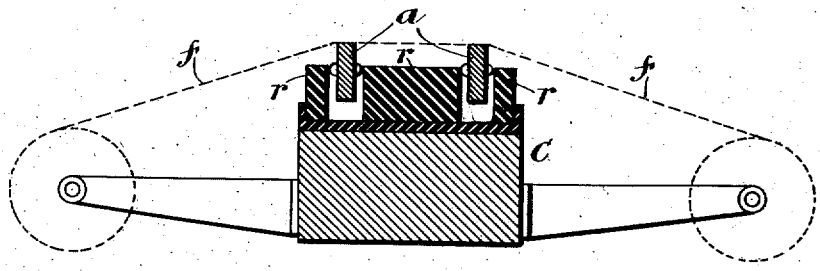

Figure 1 is a diagrammatic perspective view of one form of said devices; Fig. 2 a plan of Fig. 1; Fig. 3 a diagrammatic cross-section;

As well known, the singeing of textile fabrics involves removal, by superficial combustion, of the therefrom projecting pile, nap, or down. Attempts have been made to so singe such fabrics by moving them in proximity to metallic wires, or bars, heated by electricity. Such wires, being of relatively small cross-section, have proved unable to supply sufficient heat for rapid singeing. Said bars, of relatively much greater cross-section, require, to bring them to incandescence, a very intensive current. The resistance of such bars being small, compels resort to generators of low tension, involving the use of conductors of considerable section and expensive connections.

I avoid the disadvantages referred to by using a pair of bars constituting part of the secondary circuit of an induction transformer whose primary circuit is supplied by a current of normal tension.

Referring now to the drawings, *a* are the heating bars, composed preferably of comparatively infusible metal, such as nickel or its alloys, these bars being connected by the extension *b*, disposed to pass through electro-magnetic core *c*, another portion of which is wound with the primary coil *d*, connected with source of electrical energy *n*, the said bars *a* thus constituting part of the secondary circuit of the transformer.

*e* is a movable electro-conducting member contacting with each of said bars to complete the secondary circuit.

*f* is a spring, disposed to exert tension upon the bars and maintain their rectilinearity during contraction and expansion due to variations in temperature.

It will be observed that those portions *a'* of the secondary more proximately disposed relatively to the core are of considerably greater cross-section than those parts constituting the singeing bars *a*, whereby, owing to their resulting increased resistance, I am enabled to raise the latter to the required high temperatures without unduly heating the primary.

Fig. 3 illustrates the bars *a* surrounded in part by refractory material *r* whereby loss of heat by radiation is diminished.

An important feature of my present invention is the connecting bridge or movable conducting member *e*, by means of which I am enabled to limit the heated extent of said bars. It will be understood that the fabrics are usually moved over the bars in contact with latter, whereby considerable heat is withdrawn from the bars and their temperature, at the portions so contacted, kept down sufficiently to prevent unduly burning the fabric. Those portions of the bars located outside of said zone of contact by the fabric retain much higher temperatures than those parts so contacted, with the result that, except for said movable member, the selvages of the fabric would be likely to be undesirably burned, as the fabric sways slightly in its passage, by contact with the outlying undesirably heated portions of the bars. By imparting movability to the said bridge *e*, I am enabled to regulate the length of the heated portions of the bars to suit the varying widths of fabric singed, whereby the aforesaid difficulty is obviated.

The required movable support may be imparted to the bridge *e* in any convenient manner, as for instance, by providing it with lateral flanges *m*, adapted to be received, and slide in grooves *i* on the inner sides of bars *a*, thus permitting bridge *e* to be pushed manually by the operator to the exact position required. To facilitate such manual operation, a handle *h*, or other equivalent device, may be annexed to said bridge *e*.

The operation of the device will be readily understood. The movable member or conducting bridge *e* being moved, adjusted and left in place to correspond with the width of the particular fabric to be treated and the current turned on, the fabric is reeled rapidly over and preferably in contact with the bars, as diagrammatically illustrated in Fig. 3, the reels being indicated by the dotted circles and the fabric by these and the straight dotted lines, such procedure being too well understood by those skilled in the art to require more detailed description here.

The duplication of the singeing bars, as shown, facilitates, enhances and renders more thorough the singeing required.

Having now described my invention, what I claim as new and desire to secure by Letters Patent is the following, viz:—

1. A device for singeing textile fabrics comprising a pair of electrically heated bars and, contacting therewith, a movable conducting member to limit the extent of said bars so heated.

2. A device for singeing textile fabrics comprising a pair of electrically heated singeing bars constituting part of the secondary circuit of an induction transformer and, contacting with said bars, a movable conducting member to limit the extent of said bars so heated.

3. A device for singeing textile fabrics comprising a pair of electrically heated singeing bars constituting part of the secondary circuit of an induction transformer and of smaller cross section than other parts of said secondary and, contacting with said bars, a movable conducting member to limit the extent of said bars so heated.

4. A device for singeing textile fabrics comprising a pair of electrically heated singeing bars constituting part of the secondary circuit of an induction transformer, both said bars having equally extensive and parallel operative portions supported and disposed to simultaneously singe said fabrics substantially as described.

5. A device for singeing textile fabrics comprising a pair of electrically heated singeing bars constituting part of the conductor of the secondary circuit of an induction transformer, said bars being of smaller cross-section than other parts of said conductor.

GUSTAVE GIN.

Witnesses:
DEAN M. MASON,
JACQUES MANCEL.